(12) United States Patent
Kwok et al.

(10) Patent No.: US 12,168,992 B2
(45) Date of Patent: Dec. 17, 2024

(54) HARDWARE ASSEMBLY

(71) Applicant: THE HILLMAN GROUP, INC., Cincinnati, OH (US)

(72) Inventors: Kwan Ming Edwin Kwok, Ontario (CA); Beesham Mahadeo, Toronto (CA)

(73) Assignee: THE HILLMAN GROUP, INC., Forest Park, OH (US)

( * ) Notice: Subject to any disclaimer, the term of this patent is extended or adjusted under 35 U.S.C. 154(b) by 206 days.

(21) Appl. No.: 17/880,264

(22) Filed: Aug. 3, 2022

(65) Prior Publication Data

US 2023/0039968 A1 Feb. 9, 2023

Related U.S. Application Data

(60) Provisional application No. 63/229,727, filed on Aug. 5, 2021.

(51) Int. Cl.
*F16B 37/14* (2006.01)
*F16B 39/28* (2006.01)

(52) U.S. Cl.
CPC ............ *F16B 37/145* (2013.01); *F16B 39/28* (2013.01); *F16B 37/14* (2013.01)

(58) Field of Classification Search
CPC ........ F16B 35/00; F16B 37/14; F16B 37/145; F16B 39/24; F16B 39/28; Y10S 411/924–925
USPC ..... 411/132–134, 190–191, 204, 372.5–374, 411/383
See application file for complete search history.

(56) References Cited

U.S. PATENT DOCUMENTS

| | | | |
|---|---|---|---|
| 111,996 | A | 2/1871 | Washbourne |
| 153,500 | A | 7/1874 | Seymour |
| 156,699 | A | 11/1874 | Fuller |
| 236,723 | A | 1/1881 | Sellers |
| 529,683 | A | 11/1894 | Herman |
| D30,898 | S | 5/1899 | Paine |
| 721,411 | A | 2/1903 | Alexander |
| 933,865 | A | 9/1909 | Umholtz |
| 937,199 | A | 10/1909 | Willard |

(Continued)

FOREIGN PATENT DOCUMENTS

| CN | 200985943 | 12/2007 |
|---|---|---|
| CN | 201382063 | 1/2010 |

(Continued)

*Primary Examiner* — Roberta S Delisle
(74) *Attorney, Agent, or Firm* — THOMPSON HINE LLP

(57) ABSTRACT

A hardware apparatus includes a washer/nut member comprising a disc-shaped base plate with a nut-shaped projection extending therefrom, wherein the nut-shaped projection includes a through passage to the disc-shaped base plate and the disc-shaped base plate includes a through opening aligned with the through passage. An insert is positionable within the through passage of the nut-shaped projection, the insert including a disc-shaped flange, a projection at one side of the flange, and a passage through the flange and the projection, wherein the projection is engageable in the through opening, wherein a perimeter shape of the projection is configured to cooperate with a perimeter shape of the through opening to prevent rotation of the insert relative to the washer/nut member.

18 Claims, 11 Drawing Sheets

(56) References Cited

U.S. PATENT DOCUMENTS

| | | | |
|---|---|---|---|
| 964,827 A | 7/1910 | Whitmore |
| 970,423 A | 9/1910 | Cunningham |
| 974,637 A | 11/1910 | Borup |
| 1,044,055 A | 11/1912 | Johnson |
| 1,086,737 A | 2/1914 | Taylor |
| 1,152,960 A | 9/1915 | Moloney |
| 1,162,467 A | 11/1915 | Fitz |
| 1,301,302 A | 4/1919 | Nolan |
| 1,368,222 A | 2/1921 | Foreman |
| 1,374,963 A | 4/1921 | Stevenson |
| 1,400,531 A | 12/1921 | Dodds |
| 1,401,684 A | 12/1921 | Flannery |
| 1,480,253 A | 5/1923 | Fisher |
| 1,506,005 A | 8/1924 | Kraft |
| 1,507,840 A | 9/1924 | Landgraf |
| 1,604,690 A | 10/1926 | Edwin |
| 1,640,650 A | 8/1927 | Ehrhardt |
| 1,673,486 A | 6/1928 | Berge |
| 1,674,258 A | 6/1928 | Obergfell |
| 1,703,232 A | 2/1929 | Gray |
| 1,908,080 A | 5/1933 | Thompson |
| 1,994,978 A | 3/1935 | Brown |
| 2,111,110 A | 3/1938 | Deniston, Jr. |
| 2,278,320 A | 5/1941 | Kath |
| 2,345,949 A | 2/1942 | Robbins |
| 2,316,695 A | 4/1943 | Harry |
| 2,816,473 A | 12/1957 | Labee |
| 3,042,068 A | 7/1962 | Smith |
| 3,156,281 A | 11/1964 | Demi |
| 3,174,383 A | 3/1965 | Heil |
| 3,204,586 A | 9/1965 | Marsh |
| 3,212,387 A | 10/1965 | Madansky |
| 3,226,118 A | 12/1965 | Nehl |
| 3,266,828 A | 8/1966 | Baier |
| 3,269,228 A | 8/1966 | Mack |
| 3,270,610 A | 9/1966 | Knowlton |
| 3,305,987 A | 2/1967 | Weaver |
| 3,315,720 A | 4/1967 | Gutshall |
| 3,449,997 A | 6/1969 | Couch |
| 3,478,639 A | 11/1969 | Gruca |
| 3,492,841 A | 2/1970 | Ipri |
| 3,640,557 A | 2/1972 | Nute, Jr. |
| D233,138 S | 10/1974 | Vogel |
| 3,851,978 A | 12/1974 | Kuipers |
| 3,852,931 A | 12/1974 | Morse |
| 3,965,793 A | 6/1976 | Roser |
| 4,033,243 A | 7/1977 | Kirrish |
| 4,080,768 A | 3/1978 | Trixl |
| 4,092,896 A | 6/1978 | Puchy |
| 4,111,568 A | 9/1978 | Wing |
| 4,125,140 A | 11/1978 | Basile |
| 4,134,438 A | 1/1979 | Frieberg |
| 4,207,938 A | 6/1980 | Mortus |
| 4,214,505 A | 7/1980 | Aimar |
| D256,553 S | 8/1980 | Fayle |
| 4,238,165 A | 12/1980 | Wagner |
| 4,242,932 A | 1/1981 | Barmore |
| 4,257,465 A | 3/1981 | Berg |
| 4,274,754 A | 6/1981 | Cohen |
| 4,281,699 A | 8/1981 | Grube |
| 4,302,137 A | 11/1981 | Hart |
| 4,361,997 A | 12/1982 | DeCaro |
| 4,400,123 A | 8/1983 | Dunegan |
| 4,380,413 A | 9/1983 | Dewey |
| 4,413,374 A | 11/1983 | Ferdinand |
| 4,436,005 A | 3/1984 | Hanson |
| 4,453,763 A | 6/1984 | Richards |
| D276,879 S | 12/1984 | Bell |
| D278,029 S | 3/1985 | Suponitsky |
| 4,507,009 A | 3/1985 | Tardif |
| 4,521,146 A | 6/1985 | Wharton |
| 4,540,322 A | 9/1985 | Coffia |
| 4,582,462 A | 4/1986 | Thiel |
| D284,265 S | 6/1986 | Resan |
| 4,601,624 A | 7/1986 | Hill |
| 4,611,379 A | 9/1986 | Heitzman |
| 4,621,230 A | 11/1986 | Crouch |
| 4,630,984 A | 12/1986 | Reinwall |
| 4,631,887 A | 12/1986 | Francovitch |
| 4,632,616 A | 12/1986 | Sidoti |
| 4,683,670 A | 8/1987 | Bates |
| 4,701,089 A | 10/1987 | Nettel |
| 4,708,555 A | 11/1987 | Terry |
| 4,726,723 A | 2/1988 | Bainbridge |
| 4,733,986 A | 3/1988 | Kenning |
| 4,732,517 A | 9/1988 | Crouch |
| 4,786,224 A | 11/1988 | Wharton |
| 4,822,223 A | 4/1989 | Williams |
| 4,867,624 A | 9/1989 | Walley |
| 4,884,932 A | 12/1989 | Meyer |
| 4,887,951 A | 12/1989 | Hashimoto |
| D311,131 S | 10/1990 | Saito |
| 4,988,351 A | 1/1991 | Paulos |
| 4,998,780 A | 3/1991 | Eshler |
| 5,030,052 A | 7/1991 | Anderson |
| 5,082,412 A | 1/1992 | Thomas |
| 5,175,665 A | 12/1992 | Pegg |
| 5,201,627 A | 4/1993 | Biedenbach |
| 5,217,339 A | 6/1993 | O'Connor |
| 5,302,069 A | 4/1994 | Toth |
| D359,294 S | 6/1995 | Szabo |
| D359,295 S | 6/1995 | Szabo |
| D359,970 S | 7/1995 | Szabo |
| 5,433,570 A | 7/1995 | Koppel |
| 5,443,582 A | 8/1995 | Ching |
| 5,517,730 A | 5/1996 | Ho |
| 5,577,353 A | 11/1996 | Simpson |
| 5,626,449 A | 5/1997 | McKinlay |
| 5,628,599 A * | 5/1997 | Eakin .................. F16B 33/002 411/957 |
| D380,668 S | 7/1997 | Nakamura |
| 5,651,651 A | 7/1997 | Spencer |
| 5,653,564 A | 8/1997 | Nakamura |
| D386,068 S | 11/1997 | Nakamura |
| 5,697,746 A | 12/1997 | Brown |
| 5,711,711 A | 1/1998 | Schmidt |
| 5,728,136 A | 3/1998 | Thal |
| 5,752,795 A | 5/1998 | D'Adamo |
| 5,769,144 A | 6/1998 | Carter |
| 5,779,380 A | 7/1998 | Knapp |
| 5,782,078 A | 7/1998 | Brantley |
| 5,870,934 A | 2/1999 | Cullinan |
| 5,879,117 A * | 3/1999 | Chen .................. B60R 13/105 411/372.6 |
| 5,890,859 A | 4/1999 | Hasnik |
| 5,904,383 A * | 5/1999 | van der Wal .......... B63B 17/00 70/229 |
| 5,908,278 A | 6/1999 | Hasan |
| 5,927,921 A | 7/1999 | Hukari |
| 5,950,506 A | 9/1999 | Busse |
| D416,192 S | 11/1999 | Tu |
| 5,988,966 A * | 11/1999 | Chen .................. F16B 37/14 411/372 |
| D418,048 S | 12/1999 | Chan |
| 5,997,229 A | 12/1999 | Akers |
| 6,039,140 A | 3/2000 | Painter |
| D422,202 S | 4/2000 | Maki |
| 6,045,312 A | 4/2000 | Hsing |
| 6,047,513 A | 4/2000 | Gibson |
| 6,053,654 A | 4/2000 | Ledingham |
| 6,053,681 A * | 4/2000 | Mattershead ......... F16B 37/14 411/374 |
| 6,053,683 A * | 4/2000 | Cabiran ............... F16B 37/14 411/374 |
| 6,105,332 A | 8/2000 | Boyadjian |
| D432,006 S | 10/2000 | Hussaini |
| 6,135,691 A | 10/2000 | Nadarajah |
| 6,186,698 B1 | 2/2001 | Knapp |
| 6,220,804 B1 | 4/2001 | Pamer |
| 6,250,841 B1 | 6/2001 | Ledingham |
| 6,273,658 B1 | 8/2001 | Patterson |
| 6,287,045 B1 | 9/2001 | Ledingham |
| 6,295,900 B1 | 10/2001 | Julicher |
| 6,309,158 B1 | 10/2001 | Bellinghausen |

(56) References Cited

U.S. PATENT DOCUMENTS

| | | | |
|---|---|---|---|
| D452,429 S | 12/2001 | Shinjo | |
| 6,332,741 B1 | 12/2001 | Janusz | |
| 6,361,258 B1 | 3/2002 | Heesch | |
| 6,383,187 B2 | 5/2002 | Törmälä | |
| 6,387,129 B2 | 5/2002 | Rieser | |
| D459,207 S | 6/2002 | Miyata | |
| 6,457,923 B1 | 10/2002 | Grossman | |
| 6,478,518 B1 | 11/2002 | Hwang | |
| 6,494,658 B1 | 12/2002 | Roy | |
| 6,523,309 B1 | 2/2003 | Finlay | |
| 6,540,750 B2 | 4/2003 | Burkhart | |
| 6,565,303 B1 | 5/2003 | Riccitelli | |
| D483,252 S | 12/2003 | Williamson | |
| 6,719,511 B2 | 4/2004 | Notaro | |
| 6,764,114 B1 | 7/2004 | Guillon | |
| 6,923,230 B2 | 8/2005 | Airoldi | |
| 6,964,549 B2 * | 11/2005 | Fallon | F16B 37/14 411/372.6 |
| D512,886 S | 12/2005 | Christensen | |
| 7,004,436 B2 | 2/2006 | Knapp | |
| 7,004,701 B2 | 2/2006 | Ross | |
| D520,856 S | 5/2006 | Osiecki | |
| D524,149 S | 7/2006 | Kim | |
| D549,091 S | 8/2007 | McIntyre | |
| D551,972 S | 10/2007 | Jacobs | |
| D552,977 S | 10/2007 | He | |
| D557,131 S | 12/2007 | Liu | |
| D557,132 S | 12/2007 | Shinjo | |
| 7,306,418 B2 | 12/2007 | Kornblum | |
| D567,074 S | 4/2008 | Gallien | |
| 7,351,020 B1 | 4/2008 | Notaro | |
| 7,384,225 B2 | 6/2008 | Woolstencroft | |
| 7,402,016 B2 | 7/2008 | Yin-Feng | |
| 7,445,414 B1 | 11/2008 | Notaro | |
| D581,776 S | 12/2008 | Yin-Feng | |
| D581,778 S | 12/2008 | Lesesky | |
| D585,731 S | 2/2009 | Carrillo, Sr. | |
| D588,893 S | 3/2009 | Radich | |
| D600,108 S | 9/2009 | Swan | |
| D601,004 S | 9/2009 | Hagins | |
| 7,588,386 B2 | 9/2009 | Kielczewski | |
| D602,349 S | 10/2009 | Andersson | |
| D608,626 S | 1/2010 | Camisasca | |
| D609,999 S | 2/2010 | Andersson | |
| D610,717 S | 2/2010 | Lin | |
| 7,658,580 B1 | 2/2010 | Conway | |
| D613,594 S | 4/2010 | Huang | |
| D613,595 S | 4/2010 | Huang | |
| D614,247 S | 4/2010 | Clausen | |
| 7,784,150 B2 | 8/2010 | Anderson | |
| 7,866,931 B2 | 1/2011 | Murtha | |
| 7,877,939 B2 | 2/2011 | Knapp | |
| 7,891,144 B2 | 2/2011 | Gilstrap | |
| D637,071 S | 5/2011 | Gaudron | |
| 7,938,601 B2 | 5/2011 | Jordan | |
| 7,981,143 B2 | 7/2011 | Doubler | |
| D643,279 S | 8/2011 | Crane | |
| 8,002,509 B2 | 8/2011 | Rosemann | |
| D644,921 S | 9/2011 | Hsu | |
| D646,153 S | 10/2011 | Andersson | |
| D646,154 S | 10/2011 | Andersson | |
| 8,051,690 B2 | 11/2011 | Camisasca | |
| 8,347,566 B2 | 1/2013 | Knapp | |
| D678,756 S | 3/2013 | Tsai | |
| D679,988 S | 4/2013 | Yamazaki | |
| D682,666 S | 5/2013 | Wigboldy | |
| 8,454,291 B2 | 6/2013 | Guyomard | |
| 8,459,604 B2 | 6/2013 | Smith | |
| 8,506,199 B2 | 8/2013 | Rump | |
| 8,540,201 B2 | 9/2013 | Gadd | |
| D691,033 S | 10/2013 | Allman | |
| D696,930 S | 1/2014 | Rodenhouse | |
| D696,932 S | 1/2014 | Rodenhouse | |
| D698,234 S | 1/2014 | Bauer | |
| 8,622,677 B2 | 1/2014 | Wu | |
| D698,637 S | 2/2014 | Su | |
| D706,126 S | 6/2014 | Orow | |
| D713,243 S | 9/2014 | Hsu | |
| D717,207 S | 11/2014 | Fondas | |
| 8,894,339 B2 | 11/2014 | Yin-Feng | |
| 8,904,719 B2 | 12/2014 | Knapp | |
| D720,785 S | 1/2015 | Sato | |
| D721,423 S | 1/2015 | Jacques | |
| D725,461 S | 3/2015 | Kopp | |
| 9,004,836 B2 | 4/2015 | Wells | |
| 9,027,897 B2 | 5/2015 | Hill | |
| D733,546 S | 7/2015 | Balzhiser | |
| D735,076 S | 7/2015 | Fondas | |
| 9,377,047 B2 | 6/2016 | Hill | |
| D760,582 S | 7/2016 | Muzic | |
| D788,574 S | 6/2017 | Baiz | |
| D798,701 S | 10/2017 | Hill | |
| D803,040 S | 11/2017 | Schuit | |
| D805,882 S | 12/2017 | Berry | |
| D813,027 S | 3/2018 | Wright | |
| 9,957,998 B2 | 5/2018 | Hill | |
| D821,859 S | 7/2018 | Artino | |
| D832,184 S | 10/2018 | Woolstencroft | |
| D856,126 S | 8/2019 | Liu | |
| D864,125 S | 10/2019 | Selig | |
| D870,545 S | 12/2019 | Hill | |
| D871,201 S | 12/2019 | Shinjo | |
| D878,194 S | 3/2020 | Lee | |
| 10,612,581 B2 | 4/2020 | Rajewski | |
| 2002/0062617 A1 | 5/2002 | diGirolamo | |
| 2002/0197132 A1 | 12/2002 | Cruz | |
| 2003/0165371 A1 | 9/2003 | Notaro | |
| 2004/0170487 A1 | 9/2004 | Thompson | |
| 2005/0053446 A1 | 3/2005 | Huang | |
| 2006/0067804 A1 | 3/2006 | Kornblum | |
| 2007/0036630 A1 * | 2/2007 | Clifton Butzer | F16B 43/00 411/160 |
| 2007/0154258 A1 | 7/2007 | Knapp | |
| 2008/0044254 A1 | 2/2008 | Wilson | |
| 2009/0108149 A1 | 4/2009 | Goto | |
| 2009/0129887 A1 | 5/2009 | Chang | |
| 2010/0086348 A1 | 4/2010 | Funahashi | |
| 2010/0172718 A1 | 7/2010 | Gong | |
| 2010/0196119 A1 | 8/2010 | Miyagawa | |
| 2011/0107710 A1 | 5/2011 | Sias | |
| 2011/0121152 A1 | 5/2011 | Ghatikar | |
| 2011/0170983 A1 | 7/2011 | Day | |
| 2011/0173916 A1 | 7/2011 | Knapp | |
| 2011/0214461 A1 | 9/2011 | Camisasca | |
| 2011/0226096 A1 | 9/2011 | Berton | |
| 2011/0250035 A1 | 10/2011 | Goldberg | |
| 2012/0219380 A1 | 8/2012 | Hutter | |
| 2013/0089388 A1 | 4/2013 | Liu | |
| 2013/0136557 A1 | 5/2013 | Wang | |
| 2013/0334389 A1 | 12/2013 | Hill | |
| 2013/0334392 A1 | 12/2013 | Hill | |
| 2013/0336743 A1 * | 12/2013 | Hill | F16B 37/14 411/372.6 |
| 2013/0340375 A1 | 12/2013 | Hill | |
| 2014/0007541 A1 | 1/2014 | Hill | |
| 2014/0023457 A1 | 1/2014 | Gaudron | |
| 2014/0178150 A1 | 6/2014 | Su | |
| 2014/0341649 A1 | 11/2014 | Bryan | |
| 2014/0369787 A1 | 12/2014 | Hill | |
| 2014/0377034 A1 * | 12/2014 | Cottrell | F16B 29/00 411/315 |
| 2015/0071731 A1 | 3/2015 | Scheerer | |
| 2015/0093213 A1 | 4/2015 | Scheerer | |
| 2016/0238054 A1 | 8/2016 | Lehtola | |
| 2016/0273573 A1 | 9/2016 | Hill | |
| 2017/0089385 A1 | 3/2017 | Leichti | |
| 2017/0108026 A1 | 4/2017 | Yang | |
| 2017/0138386 A1 | 5/2017 | Hsu | |
| 2017/0282236 A1 | 10/2017 | Hutter | |

(56) References Cited

U.S. PATENT DOCUMENTS

2017/0284447 A1    10/2017  Falkenstein
2018/0110331 A1*   4/2018   Mack ................... A47B 47/025

FOREIGN PATENT DOCUMENTS

| EP | 2246578 A1      | 3/2010  |
|----|------------------|---------|
| EP | 2226440 A2      | 3/2011  |
| EP | 2886731 A1      | 6/2015  |
| EP | 2664724 B1      | 10/2015 |
| FR | 2751355         | 1/1998  |
| JP | 200112442       | 1/2001  |
| KR | 200169430       | 11/1999 |
| KR | 200183592       | 3/2000  |
| WO | WO-9207198 A1   | 4/1992  |
| WO | WO-96/11311     | 4/1996  |
| WO | WO-00/18309     | 4/2000  |
| WO | WO-2007/131166 A2 | 11/2007 |
| WO | WO-2013/092822 A2 | 6/2013  |

* cited by examiner

HARDWARE ASSEMBLY

TECHNICAL FIELD

This application relates generally to mounting hardware and, in particular, to mounting hardware that imitates architectural hardware.

BACKGROUND

Many construction projects have aesthetic designs that require the use of architectural hardware. The term "architectural hardware" refers to hardware having antique designs. If the project budget permits, actual antique hardware components can be used, or alternatively the antique hardware components can be recreated or reproduced from the same materials with the same design as the antique original. These options can be quite expensive, and thus are beyond the reach of most projects. Additionally, working with such connectors can require special skills and equipment, thus placing use and installation of architectural hardware components beyond the reach of the conventional consumer (such as a home owner).

U.S. Pat. No. 9,957,998, which is incorporated herein by reference, discloses a useful decorative hardware assembly that includes a washer/nut member and a cap. The washer/nut member includes a plurality of outer surfaces disposed in a hexagonal shape, an inner cylindrical surface disposed radially internal to the plurality of outer surfaces, an intermediate cylindrical surface disposed radially between the plurality of outer surfaces and the inner cylindrical surface, and an annular surface disposed radially between the inner cylindrical surface and the intermediate cylindrical surface. The cap is disposed within the intermediate cylindrical surface, and the inner cylindrical surface is configured to contact a shaft portion of a bolt and the annular surface is configured to contact a head portion of the bolt. This assembly works well with fasteners in which the head is configured to be engaged by a tool, but less so in the case of fasteners, such as carriage bolts, that lack such an engageable feature.

It would be desirable to provide a decorative flange nut assembly that is better adapted for use with carriage bolts and/or other types of screws or fasteners of various sizes.

SUMMARY

In one aspect, a hardware assembly include a washer/nut member and one or more inserts adapted to prevent rotation of a carriage bolt relative to the washer/nut member.

In another aspect, a hardware assembly includes a washer/nut member and one or more inserts adapted to enable use with different size fasteners.

In a further aspect, an apparatus includes a washer/nut member including a disc-shaped base plate with a nut-shaped projection extending therefrom, wherein the nut-shaped projection includes a through passage to the disc-shaped base plate and the disc-shaped base plate includes a through opening aligned with the through passage, wherein the through opening is of a rectilinear profile shape.

In a further aspect, an apparatus includes a washer/nut member includes a disc-shaped base plate with a nut-shaped projection extending therefrom, wherein the nut-shaped projection includes a through passage to the disc-shaped base plate and the disc-shaped base plate includes a through opening aligned with the through passage. A top cap is engageable in a free end of the through passage, wherein: (i) an internal wall of the through passage include a set of annular projecting lips with gaps therebetween and the top cap includes a set of radial projections size to pass through the gaps and to be positioned axially behind the lips upon rotation of the top cap for axial retention of the top cap to the nut-shaped projection, or (ii) an internal wall of the through passage includes a set of annular recessed channels, each annular recessed channel including an entry segment that runs to an end edge of the free end of the through passage, and the top cap includes a set of radial projections size to enter the entry segments and to be positioned within the annular recessed channels upon rotation of the top cap for axial retention of the top cap to the nut-shaped projection.

In a further aspect,

The details of one or more embodiments are set forth in the accompanying drawings and the description below. Other features, objects, and advantages will be apparent from the description and drawings, and from the claims.

DETAILED DESCRIPTION

Figure 1:
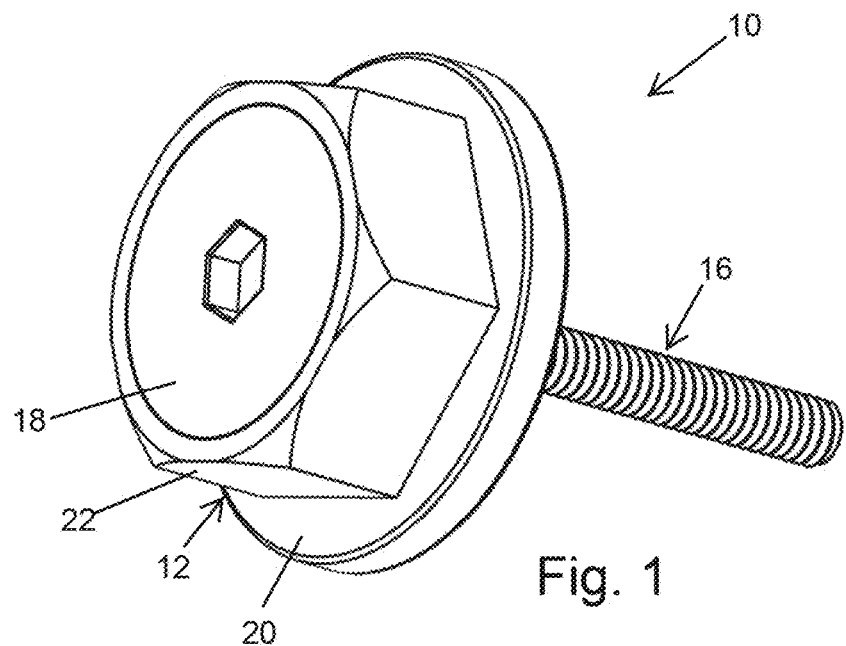
FIGS. 1-2 show perspective, assembled views of one embodiment of a hardware assembly.
Figure 2:
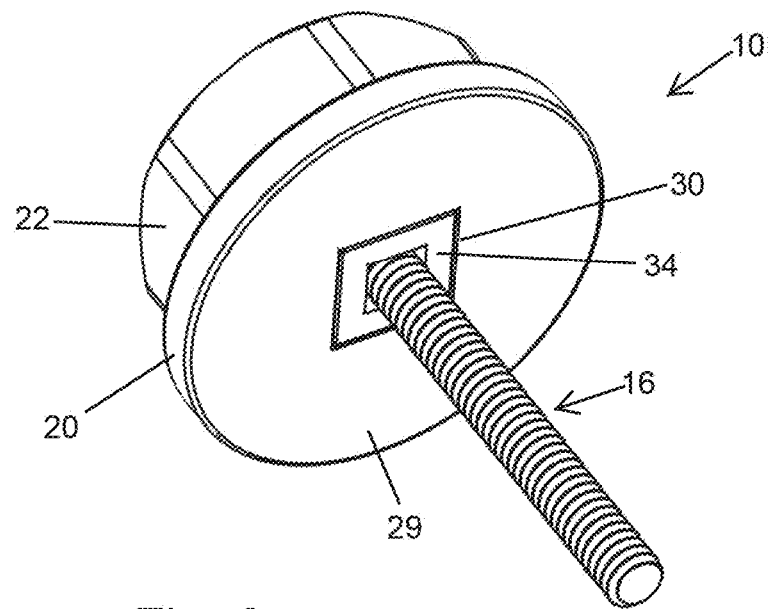

Referring to FIGS. 1-5, hardware assembly 10 includes a washer/nut member 12, an insert 14, a carriage bolt 16 and a top cap 18. The washer/nut member includes a disc-shaped base plate 20 with a nut-shaped (e.g., hex-shaped) projection 22 extending therefrom. A free end 24 of the nut-shape projection is open to a through passage 26 that leads to a surface 28 of the disc-shaped base plate 20. The disc-shaped base plate 20 includes a through opening 30 aligned with the through passage 26, and the through opening 30 is of a rectilinear profile shape, such as a substantially square profile or perimeter shape.

The insert 14 is positionable within the through passage 26 of the nut-shaped projection. The insert includes a disc-shaped flange 32 that seats against the surface 28 of the disc-shaped plate 20, and a rectilinear projection 34 (e.g., substantially square profile) at one side of the flange, and a rectilinear passage 36 (e.g. substantially square profile) through the flange and the rectilinear projection. The rectilinear projection 34 engages in the through opening 30 and cooperates with the rectilinear profile shape to prevent rotation of the insert 14 relative to the washer/nut member 12. The rectilinear projection 34 extends into, but not beyond, the structure engaging surface 29 of the disc-shaped base plate 20.

The carriage bolt 16 is engageable with the insert and includes a head portion 38 and an elongated shaft portion 40 with a distal threaded segment 42 and a rectilinear segment 44 (e.g., substantially square profile or perimeter shape when looking along the axis of the bolt) adjacent the head portion 38. The rectilinear segment 44 engages in the rectilinear passage 36 of the insert so as to prevent rotation of the carriage bolt 16 relative to both the insert 16 and the washer/nut member 12.

Figure 6:
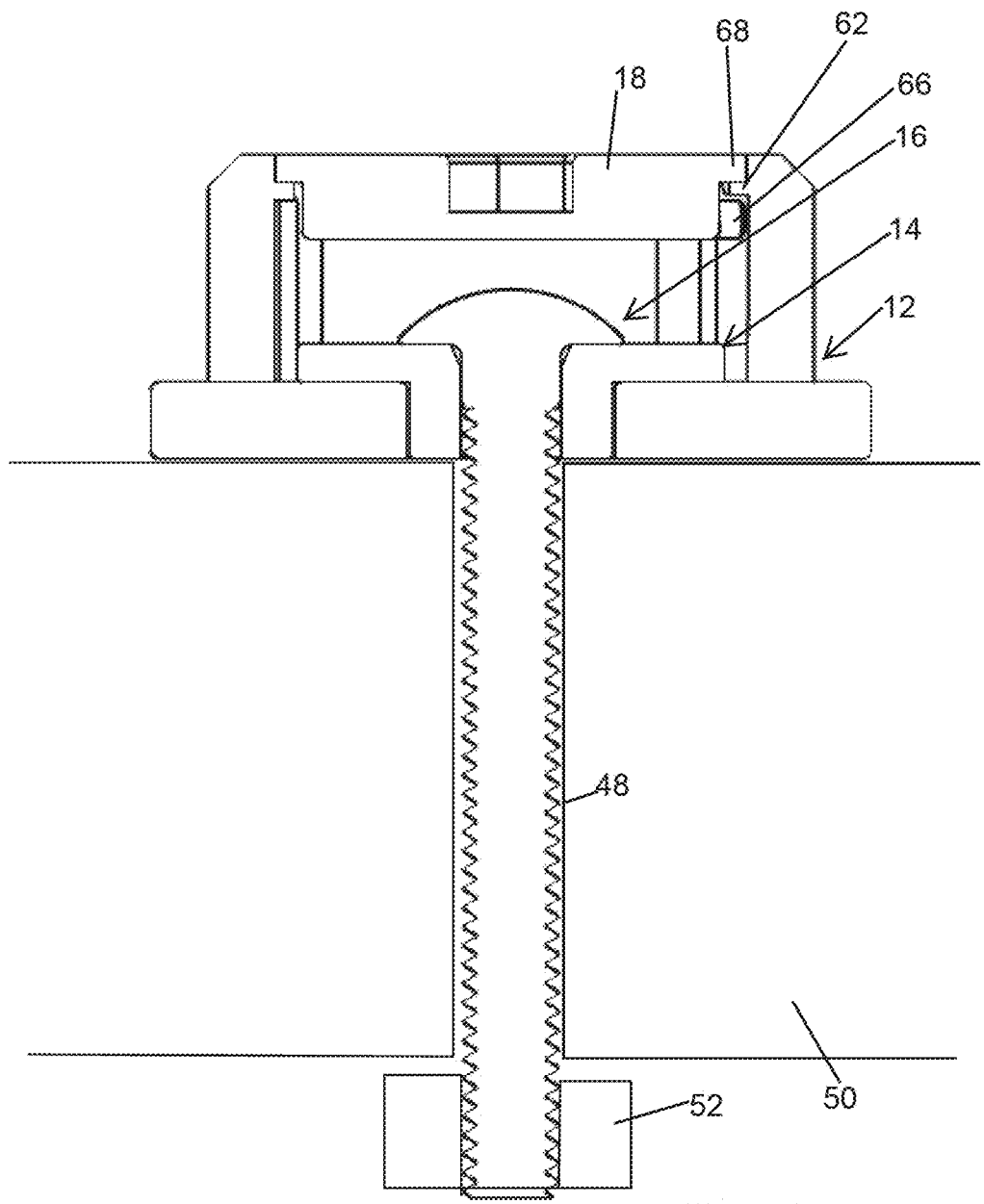
FIG. 6 shows a cross-section view of the hardware assembly on a structure.

With the above-described configuration, a hole 48 can be drilled through a structure 50 (e.g., a wooden post), the washer/nut member 12 and insert 14, with carriage bolt 16 passing therethrough, placed in alignment with the hole, such that the bolt 16 passes through the opening, per FIG. 6. A nut 52 can then be connected at the distal end of the carriage bolt 16 and tightened. During such tightening, a tool (e.g., socket or wrench) is engaged with the nut-shaped projection 22 to prevent rotation of all of the washer/nut member 12, the insert 14 and the carriage bolt 16, enabling desired tightening to be achieved. The top cap 18 is then engaged in the free end of the through passage to close the nut-shaped projection and complete the decorative appearance.

Figure 7:
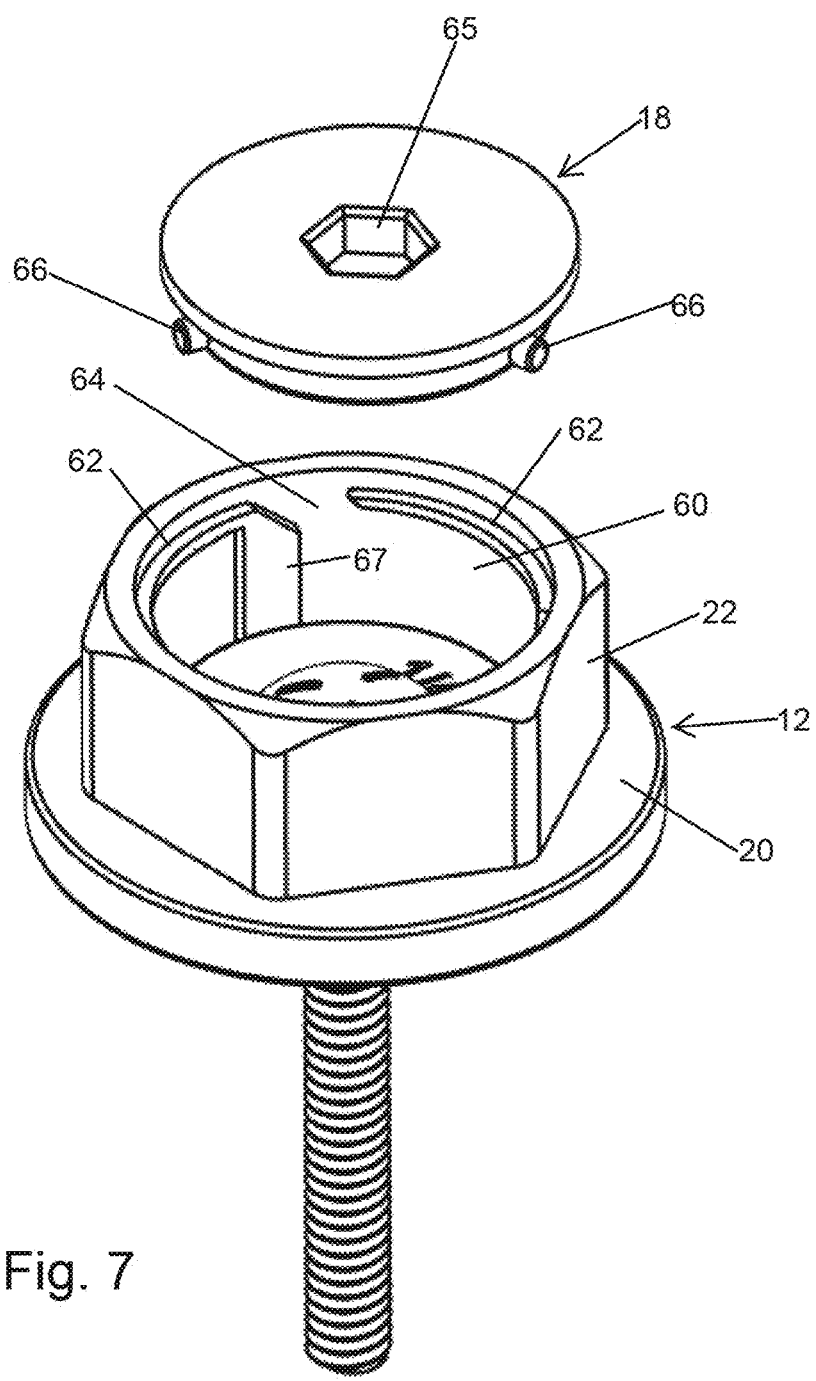
FIG. 7 shows another perspective view of the hardware assembly.

In terms of top cap engagement, in one embodiment, per FIG. 7, an internal wall 60 of the through passage includes a set (e.g., 3 shown here) of projecting lips 62, running annularly, with gaps 64 therebetween, and the top cap 18 includes a set of radial projections 66 sized to pass through the gaps 64 and to be positioned axially behind the lips 62, per FIG. 6, upon rotation of the top cap for axial retention of the top cap to the nut-shaped projection. In this regard, only a small amount of cap rotation is needed in this arrangement, such as between sixty degrees and one-hundred twenty degrees. End stop walls 67 are provided to limit the cap rotation, and the top cap includes a tool feature 65 (here a hex recess in its end face) to facilitate rotation. The exterior facing edge of the lips 62 also form a seating surface for an annular edge 68 of the top cap. Thus, the lips 62 are captured between the projections 66 and the edge 68, preventing substantial axial displacement of the top cap 18.

Figure 3:
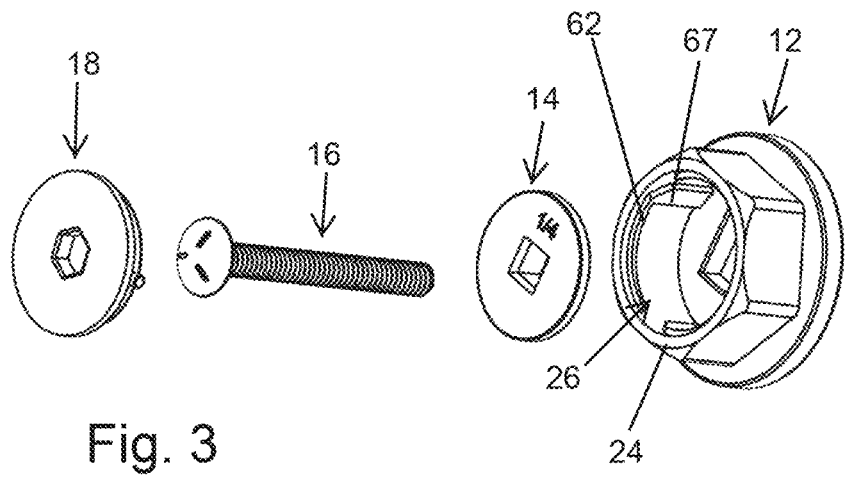
FIGS. 3-5 show perspective, exploded views of the hardware assembly.
Figure 4:
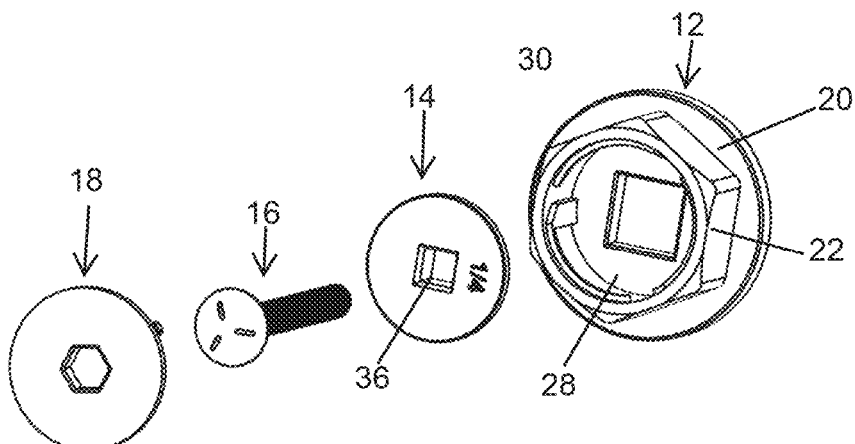
Figure 5:
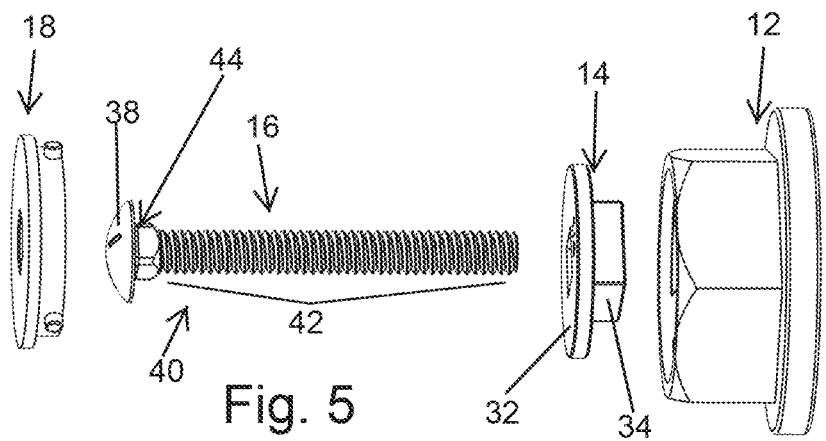
Figure 8:
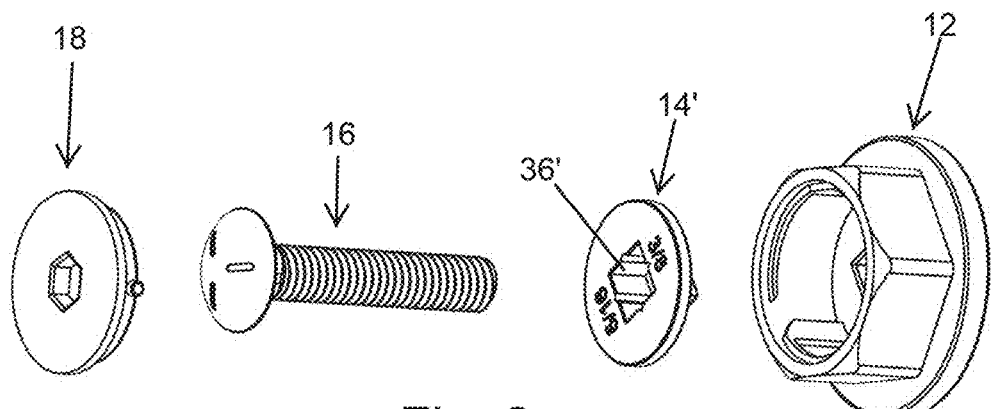
FIG. 8 shows another perspective view of the hardware assembly with a different insert.
Figure 9:
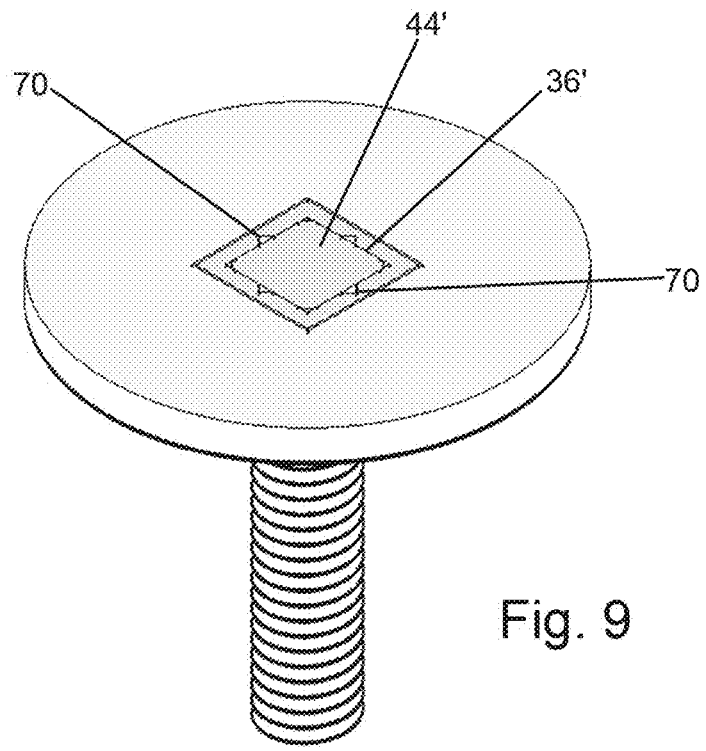
FIG. 9 is a cross-section showing the hardware assembly of FIG. 8 with one carriage bolt size.
Figure 10:
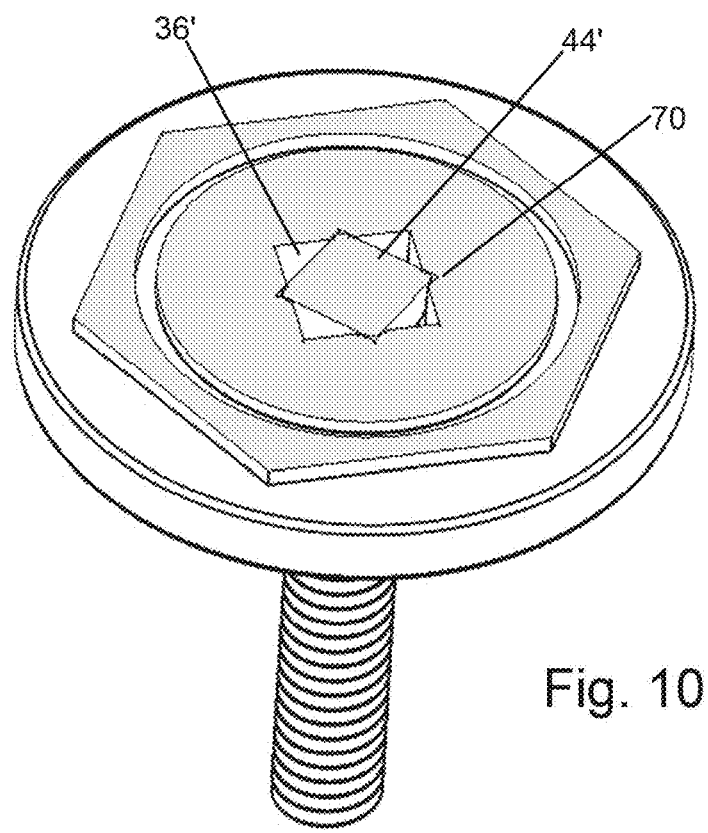
FIG. 10 is a cross-section showing the hardware assembly of FIG. 8 with a different carriage bolt size.

As suggest in FIGS. 3 and 4, the insert 14 is sized for cooperation with a carriage bolt 16 having a ¼ inch×¼ inch square segment 44 adjacent the head. In order to facilitate use of the hardware assembly with other size carriage bolts, additional inserts can be provided. By way of example, FIGS. 8-10 show an insert 14' that is usable with both a carriage bolt with a ⅜ inch by ⅜ inch square segment 44' and a carriage bolt with a 5/16 inch×5/16 inch square segment 44". Per FIG. 9, the segment 44' engages with the insert opening with the square profiles in alignment while, per FIG. 10, the segment 44" engages with the insert opening with the corners of the segment 44" engaged in right angle recesses 70 that form part of the perimeter shape of the insert passage 36'. Thus, the profile or perimeter shape of the passage of insert 14' is adapted for use with different carriage bolt sizes.

Figure 11:
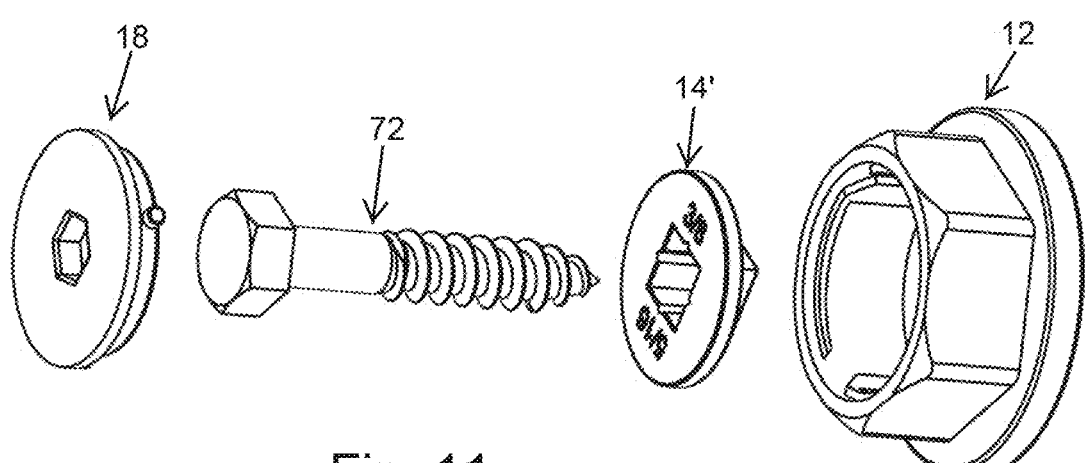
FIG. 11 shows the hardware assembly with a hex screw.

As reflected in FIG. 11, the hardware assembly utilizing inserts can still be used with ordinary fasteners, such as the illustrated hex screw 72. In this regard, the hardware assembly utilizing inserts can be used with various structural screws such as those offered under the brands TimberTite®, LedgerTite®, LumberTite®, and Power Pro®. The hardware assembly is also compatible with traditional hex bolts, hex lag bolts, and carriage bolts for sizes ¼", 5/16", ⅜", and ½".

Figure 12:
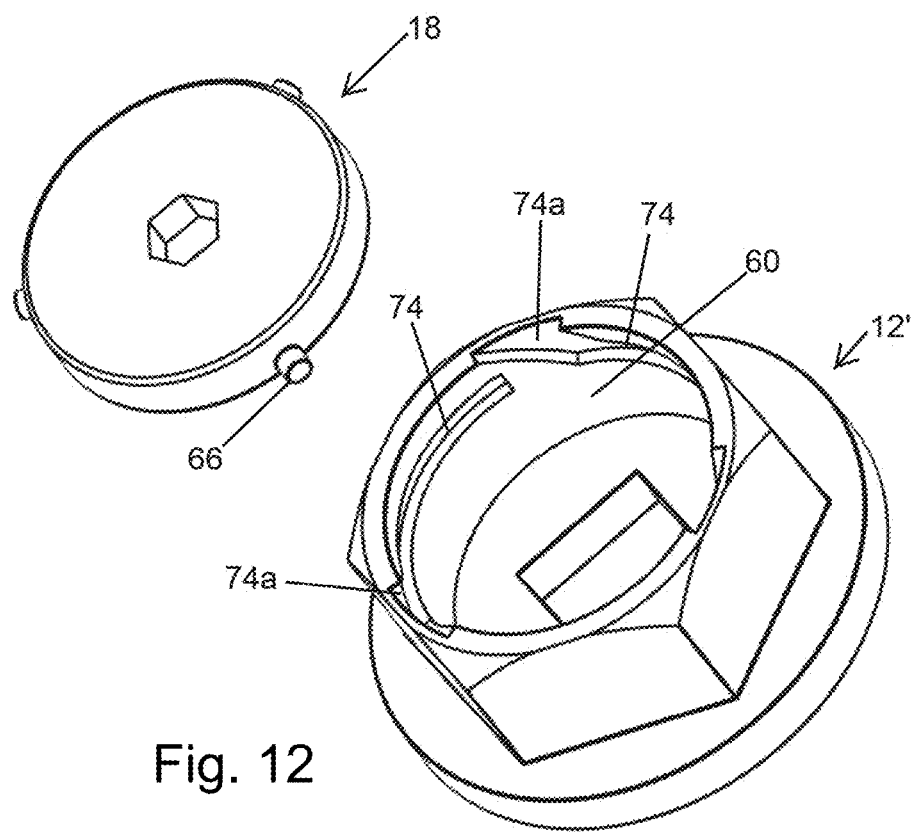
FIGS. 12-13 show an alternative top cap connection arrangement.
Figure 13:
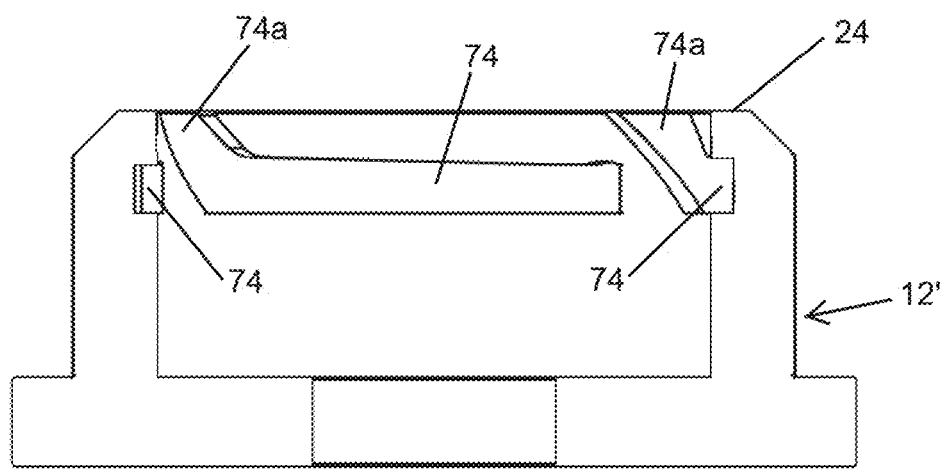

With respect to attachment of the top cap 18 to the nut-shaped projection, FIGS. 12-13 show an alternative washer/nut embodiment 12' in which the internal wall 60 includes a set of recessed channels 74, running annularly, and each of which has an entry segment 74a that runs to an end edge of the free end 24 of the through passage of the nut-shaped projection. Again, the top cap includes a set of radial projections 66 sized to enter the entry segments 74a and to be positioned within the annular recessed channels upon rotation of the top cap for axial retention of the top cap to the nut-shaped projection.

Notably, the top cap attachment arrangements using the lips or the channels, can be applied to hardware assemblies like that shown in U.S. Pat. No. 9,957,998, that do not include inserts and that are not adapted for use with carriage bolts.

Figure 14:
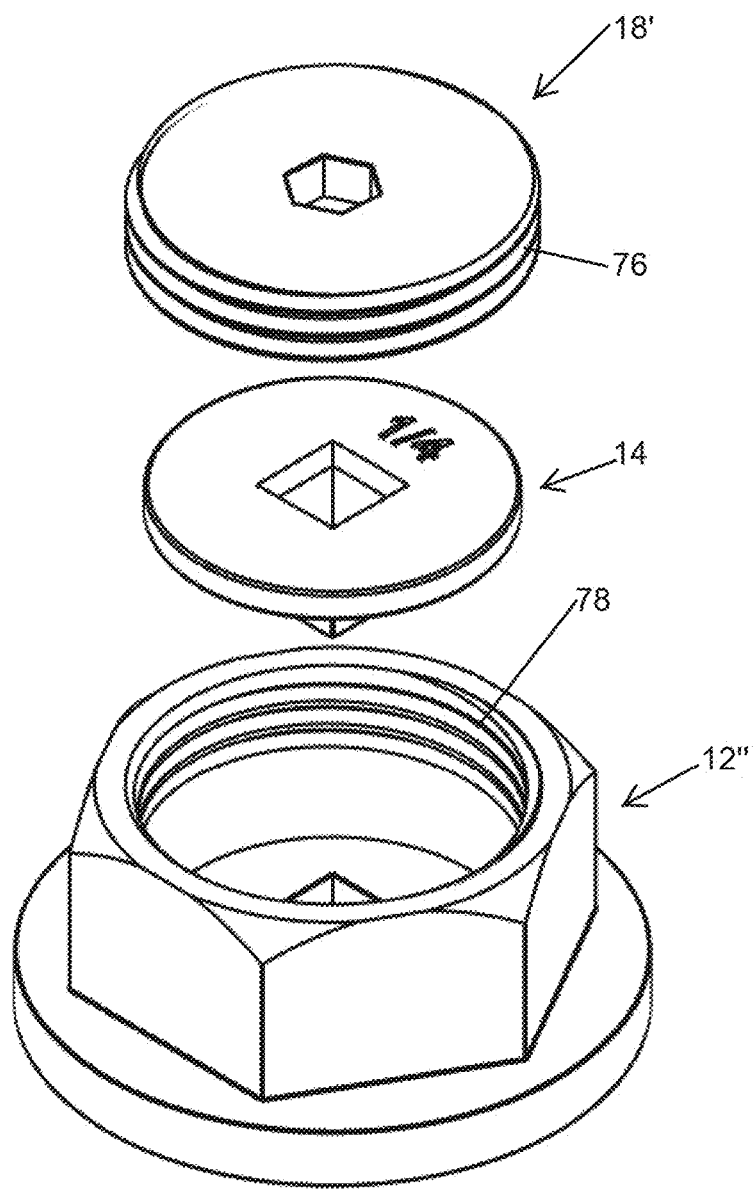
FIGS. 14-16 show another hardware assembly embodiment.
Figure 15:
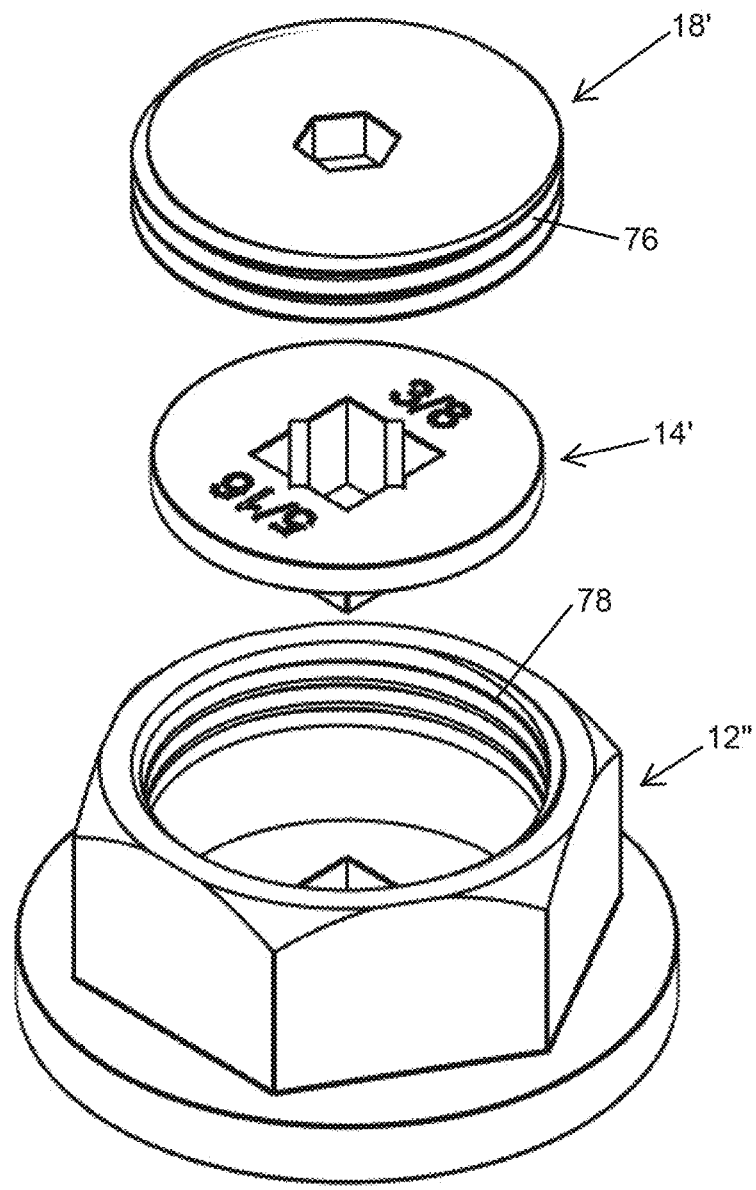
Figure 16:
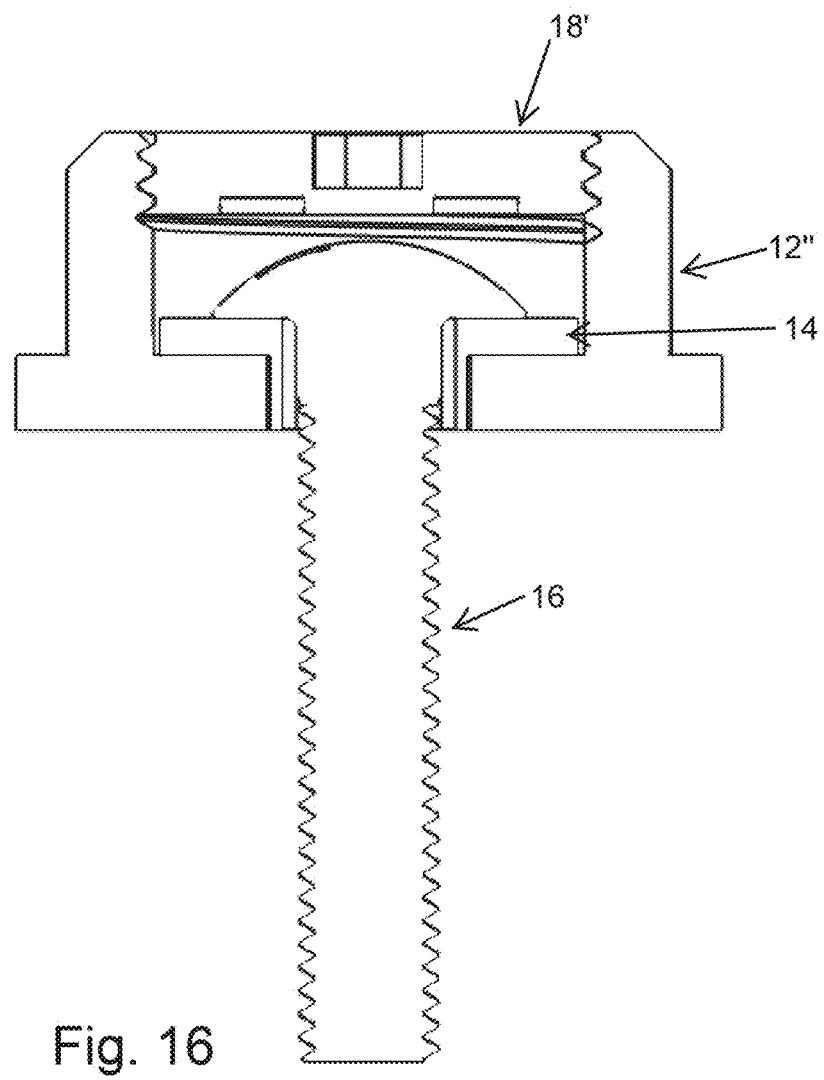

As another alternative, per FIGS. 14-16, the hardware assembly, with washer/nut 12" and inserts 14 and 14', may be configured such that the top cap 18' engages the nut-shaped projection via helically running threads 76 at the external perimeter of the top cap and helical threads 78 within the passage of the nut-shaped projection.

Figure 17:
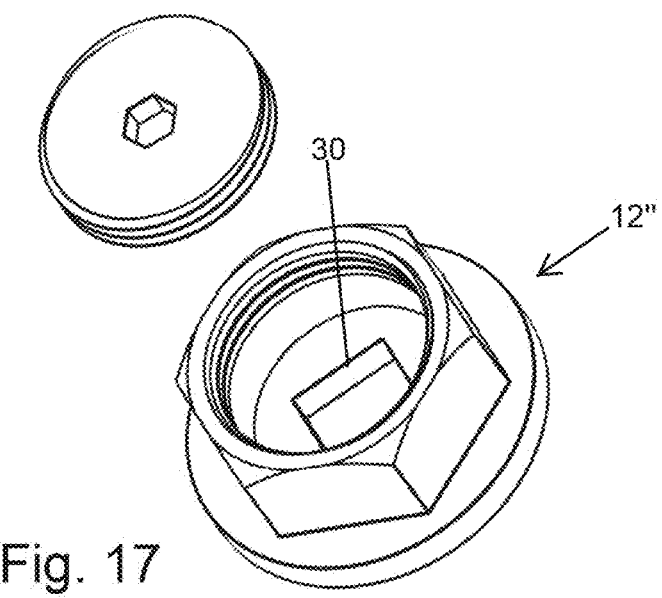
FIGS. 17 and 18 show the hardware assembly used in combination with a carriage bolt, without any insert.
Figure 18:
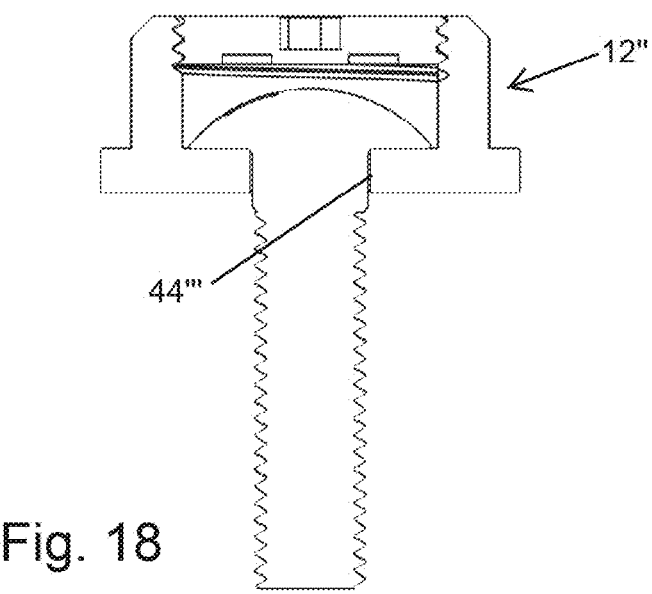

As suggested in the embodiment shown in FIGS. 17-18, the hardware assemblies described above can also be used without the inserts. In particular, the through opening 30 may be sized to interact with a ½ inch×½ inch square segment 44''' of a hex bolt. This feature is applicable to all of the embodiments above, such that a hardware assembly including the two inserts 14 and 14' is adapted for use with four different carriage bolt sizes.

It is to be clearly understood that the above description is intended by way of illustration and example only, is not intended to be taken by way of limitation, and that other changes and modifications are possible. For example, although rectilinear passages, in particular substantially square profile or perimeter shape passages and openings are described above, the profile or perimeter shape could vary, so long as the combined interaction of profile and perimeter shapes prevents rotation of the carriage bolt relative to the washer/nut member. Moreover, in some cases the openings in the base plate and the inserts need not be shaped to prevent relative rotation. In such cases, the inserts may function primarily to make the assembly adaptable for use with different size fasteners (e.g., larger fasteners engage directly in the opening of the base plate, while the insert(s) is/are used with smaller size fasteners that would pass through the larger opening of the base plate).

As used herein, the term "kit" or "hardware kit" is used to refer to a set of components that are packaged together, regardless of the type of packaging (e.g., box, bag, jar or other container type).

What is claimed is:

1. An apparatus, comprising:
a washer/nut member comprising a disc-shaped base plate with a nut-shaped projection extending therefrom, wherein the nut-shaped projection includes a through passage to the disc-shaped base plate and the disc-shaped base plate includes a through opening aligned with the through passage, wherein the through opening is of a rectilinear profile shape, wherein the nut-shaped projection is fixed to the disc-shaped base plate;
a carriage bolt or other fastener engaged with the washer/nut member, wherein the carriage bolt or other fastener includes a head portion and an elongated shaft portion, wherein the head portion of the carriage bolt or other fastener is positioned within the through passage of the nut-shaped projection.

2. The apparatus of claim 1, further comprising:
wherein the elongated shaft portion includes a rectilinear segment adjacent the head portion, and the rectilinear segment is engaged in the through opening and cooperates with the rectilinear profile shape to prevent rotation of the carriage bolt or other fastener relative to the washer/nut member.

3. The apparatus of claim 1, further comprising:
an insert positioned within the through passage of the nut-shaped projection, the insert including a disc-shaped flange, a rectilinear projection at one side of the flange, and a rectilinear passage through the flange and the rectilinear projection, wherein the rectilinear projection is engaged in the through opening and cooperates with the rectilinear profile shape to prevent rotation of the insert relative to the washer/nut member.

4. The apparatus of claim 3, further comprising:
wherein the elongated shaft portion includes a rectilinear segment adjacent the head portion, and the rectilinear segment is engaged in the rectilinear passage of the insert so as to prevent rotation of the carriage bolt or other fastener relative to both the insert and the washer/nut member.

5. The apparatus of claim 4, wherein the rectilinear profile shape is substantially square, and wherein the rectilinear passage is substantially square in profile.

6. The apparatus of claim 4, further comprising:
a top cap engaged in and closing a free end of the through passage.

7. The apparatus of claim 6, wherein the through passage includes a helical thread form and the top cap includes a helical thread form engaged with the helical thread form of the through passage.

8. The apparatus of claim 6, wherein an internal wall of the through passage includes a set of annular projecting lips with gaps therebetween and the top cap includes a set of radial projections size to pass through the gaps and to be positioned axially behind the lips upon rotation of the top cap for axial retention of the top cap to the nut-shaped projection.

9. The apparatus of claim 6, wherein an internal wall of the through passage includes a set of annular recessed channels, each annular recessed channel including an entry segment that runs to an end edge of the free end of the through passage, and the top cap includes a set of radial projections sized to enter the entry segments and to be positioned within the annular recessed channels upon rotation of the top cap for axial retention of the top cap to the nut-shaped projection.

10. A hardware kit including the apparatus of claim 1, and further comprising:
a first insert positionable within the through passage of the nut-shaped projection, the first insert including a first disc-shaped flange, a first rectilinear projection at one side of the first flange, and a first rectilinear passage through the first flange and the first rectilinear projection, wherein the first rectilinear projection is engageable in the through opening so as to cooperate with the rectilinear profile shape to prevent rotation of the first insert relative to the washer/nut member;
a second insert positionable within the through passage of the nut-shaped projection, the second insert including a second disc-shaped flange, a second rectilinear projection at one side of the second flange, and a second rectilinear passage through the second flange and the second rectilinear projection, wherein the second rectilinear projection is engageable in the through opening so as to cooperate with the rectilinear profile shape to prevent rotation of the second insert relative to the washer/nut member.

11. The hardware kit of claim 10, wherein a size of the first rectilinear passage is different than a size of second rectilinear passage.

12. The hardware kit of claim 11, wherein the first rectilinear passage is substantially square in profile and the second rectilinear passage is substantially square in profile.

13. The hardware kit of claim 10, further comprising a top cap engageable in a free end of the through passage to close the free end.

14. An apparatus, comprising:
a washer/nut member comprising a disc-shaped base plate with a nut-shaped projection extending therefrom, wherein the nut-shaped projection includes a through passage to the disc-shaped base plate and the disc-shaped base plate includes a through opening aligned with the through passage;
a top cap engageable in a free end of the through passage;
wherein:
an internal wall of the through passage include a set of annular projecting lips with gaps therebetween and the top cap includes a set of radial projections size to pass through the gaps and to be positioned axially behind the lips upon rotation of the top cap for axial retention of the top cap to the nut-shaped projection;
or
an internal wall of the through passage includes a set of annular recessed channels, each annular recessed channel including an entry segment that runs to an end edge of the free end of the through passage, and the top cap includes a set of radial projections size to enter the entry segments and to be positioned within the annular recessed channels upon rotation of the top cap for axial retention of the top cap to the nut-shaped projection.

15. An apparatus, comprising:
a washer/nut member comprising a disc-shaped base plate with a nut-shaped projection extending therefrom, wherein the nut-shaped projection includes a through passage to the disc-shaped base plate and the disc-shaped base plate includes a through opening aligned with the through passage;
an insert positioned within the through passage of the nut-shaped projection, the insert including a disc-shaped flange, a projection at one side of the flange, and a passage through the flange and the projection, wherein the projection is engaged in the through opening, wherein a perimeter shape of the projection cooperates with a perimeter shape of the through opening to prevent rotation of the insert relative to the washer/nut member.

16. The apparatus of claim 15, further comprising:
a carriage bolt or other fastener engaged with the washer/nut member and the insert, wherein the carriage bolt or other fastener includes a head portion and an elongated shaft portion, wherein the elongated shaft portion includes a rectilinear segment adjacent the head portion, and the rectilinear segment is engaged in the passage of the insert and cooperates with a perimeter shape of the passage so as to prevent rotation of the carriage bolt or other fastener relative to both the insert and the washer/nut member.

17. A hardware kit, including the apparatus of claim 15, wherein the insert is a first insert of the kit, and the hardware kit further comprises:
- a second insert positionable within the through passage of the nut-shaped projection, the second insert including a disc-shaped flange, a projection at one side of the flange, and a passage through the flange and the projection, wherein the projection is engageable in the through opening, wherein a perimeter shape of the projection is configured to cooperate with a perimeter shape of the through opening to prevent rotation of the insert relative to the washer/nut member;
- wherein a size of the passage of the first insert is different than a size of the passage of the second insert.

18. An apparatus, comprising:
- a washer/nut member comprising a disc-shaped base plate with a nut-shaped projection extending therefrom, wherein the nut-shaped projection includes a through passage to the disc-shaped base plate and the disc-shaped base plate includes a through opening aligned with the through passage;
- an insert positionable within the through passage of the nut-shaped projection, the insert including a disc-shaped flange, a projection at one side of the flange, and a passage through the flange and the projection, wherein the projection is engagable in the through opening, wherein the passage through the flange and projection has a size adapted for use with smaller size fasteners that would pass entirely through the through opening.

\* \* \* \* \*